(12) United States Patent
Xiong

(10) Patent No.: US 10,670,100 B2
(45) Date of Patent: Jun. 2, 2020

(54) PRODUCTION TECHNOLOGY OF FRICTION MATERIAL FOR BRAKE PAD OF CONSTRUCTION WASTE FILLING MATERIAL

(71) Applicant: JIANGSU JINMAISUI NEW ENERGY TECHNOLOGY CO., LTD., Yandu District (CN)

(72) Inventor: Wanjun Xiong, Jiangsu (CN)

(73) Assignee: JIANGSU JINMAISUI NEW ENERGY TECHNOLOGY CO., LTD., Yancheng, Jiangsu (CN)

( * ) Notice: Subject to any disclaimer, the term of this patent is extended or adjusted under 35 U.S.C. 154(b) by 0 days.

(21) Appl. No.: 16/090,182

(22) PCT Filed: Aug. 12, 2016

(86) PCT No.: PCT/CN2016/094932
§ 371 (c)(1),
(2) Date: Sep. 28, 2018

(87) PCT Pub. No.: WO2017/206345
PCT Pub. Date: Dec. 7, 2017

(65) Prior Publication Data
US 2019/0120314 A1    Apr. 25, 2019

(30) Foreign Application Priority Data
Jun. 1, 2016   (CN) .......................... 2016 1 0383033

(51) Int. Cl.
*F16D 69/02*    (2006.01)
*C04B 40/00*    (2006.01)
(Continued)

(52) U.S. Cl.
CPC .......... *F16D 69/026* (2013.01); *C04B 18/023* (2013.01); *C04B 18/16* (2013.01);
(Continued)

(58) Field of Classification Search
None
See application file for complete search history.

(56) References Cited

FOREIGN PATENT DOCUMENTS

| CN | 101691883 | * | 4/2010 |
| CN | 101839294 | * | 9/2010 |

(Continued)

*Primary Examiner* — Mary Lynn F Theisen

(57) ABSTRACT

The present invention provides a process for producing a friction material for a construction waste filler, including steps of: (S1) sorting a building material, removing fiber impurities, calcining, removing white garbage and metal impurities, and obtaining a first intermediate product; (S2) sifting and removing dust from the first intermediate product, obtaining an intermediate filler, cooling and then soaking after performing calcination on the intermediate filler, dehydrating, drying and obtaining a material to be mixed; (S3) evenly mixing the material to be mixed, graphite, molybdenum disulfide and other media materials, performing enhancement treatment, grinding and obtaining a building filler; and (S4) mixing composite fiber, phenolic resin, the building filler, friction material, pyrite, carbon black, alumina, and brass powder, stirring in a mixer for 20-40 min till all materials are fused, taking out a fused mixture, barreling, and obtaining the friction material for the construction waste filler.

5 Claims, 1 Drawing Sheet

Sorting a building material, removing fiber impurities, calcining, removing white garbage and metal impurities, and obtaining a first intermediate product — S1

Sifting and removing dust from the first intermediate product, obtaining an intermediate filler, cooling and then soaking after performing calcination on the intermediate filler, dehydrating, drying and obtaining a material to be mixed — S2

Evenly mixing the material to be mixed, graphite, molybdenum disulfide and other media materials according to a weight ratio of 100 : 5 : 0.5 : 4.5, performing enhancement treatment, grinding and obtaining a building filler; and — S3

Mixing 25 parts of composite fiber, 6 parts of phenolic resin, 40 parts of the building filler, 20 parts of pyrite, 0.5 parts of pyrite, 0.5 parts of carbon black, 1 part of alumina, and 7 parts of brass powder with a particle size of 40 meshes by weight, stirring in a mixer for 20-40 min till all materials are fused, taking out a fused mixture, barreling, and obtaining the friction material for the construction waste filler — S4

(51) Int. Cl.
*C04B 18/02* (2006.01)
*C04B 18/16* (2006.01)
*C04B 20/04* (2006.01)
*C04B 26/12* (2006.01)
*C04B 111/00* (2006.01)
*F16D 65/092* (2006.01)

(52) U.S. Cl.
CPC ............ *C04B 20/04* (2013.01); *C04B 26/122* (2013.01); *C04B 40/005* (2013.01); *C04B 2111/00362* (2013.01); *F16D 65/092* (2013.01); *F16D 2200/006* (2013.01); *F16D 2200/0026* (2013.01); *F16D 2200/0043* (2013.01); *F16D 2200/0052* (2013.01); *F16D 2200/0082* (2013.01); *Y02W 30/95* (2015.05)

(56) References Cited

FOREIGN PATENT DOCUMENTS

| | | | |
|---|---|---|---|
| CN | 104405804 | * | 3/2015 |
| CN | 104610916 | * | 5/2015 |
| CN | 104696399 | * | 6/2015 |
| JP | S5665075 | * | 6/1981 |
| JP | H01250629 | * | 10/1989 |

* cited by examiner

S1 — Sorting a building material, removing fiber impurities, calcining, removing white garbage and metal impurities, and obtaining a first intermediate product S2 — Sifting and removing dust from the first intermediate product, obtaining an intermediate filler, cooling and then soaking after performing calcination on the intermediate filler, dehydrating, drying and obtaining a material to be mixed S3 — Evenly mixing the material to be mixed, graphite, molybdenum disulfide and other media materials according to a weight ratio of 100 : 5 : 0.5 : 4.5, performing enhancement treatment, grinding and obtaining a building filler; and S4 — Mixing 25 parts of composite fiber, 6 parts of phenolic resin, 40 parts of the building filler, 20 parts of pyrite, 0.5 parts of pyrite, 0.5 parts of carbon black, 1 part of alumina, and 7 parts of brass powder with a particle size of 40 meshes by weight, stirring in a mixer for 20-40 min till all materials are fused, taking out a fused mixture, barreling, and obtaining the friction material for the construction waste filler

PRODUCTION TECHNOLOGY OF FRICTION MATERIAL FOR BRAKE PAD OF CONSTRUCTION WASTE FILLING MATERIAL

CROSS REFERENCE OF RELATED APPLICATION

This is a U.S. National Stage under 35 U.S.C 371 of the International Application PCT/CN2016/094932, filed Aug. 12, 2016, which claims priority under 35 U.S.C. 119(a-d) to CN 201610383033.8, filed Jun. 1, 2016.

BACKGROUND OF THE PRESENT INVENTION

Field of Invention

The present invention relates to the field of friction material production for automobile brake pads, and more particularly to a construction waste production Technology of Friction Material for Brake Pad.

Description of Related Arts

The current technology to produce automotive brake pads friction material after continuous use, due to the temperature rise, brake performance deterioration, the brake effect is not good.

Therefore, how to design a brake pad friction material production process makes the production of brake pads friction material is good thermal stability and good braking performance is the industry's urgent need to solve the problem.

SUMMARY OF THE PRESENT INVENTION

In order to solve the above-mentioned conventional technical problems, the present invention provides a construction waste filler brake friction material production process used in the production process by adding construction waste filler to produce heat stability good and good braking performance of automotive brake pads friction material.

The present invention provides a process for producing a friction material for a construction waste filler, comprising steps of:

(S1) sorting a building material, removing fiber impurities, calcining, removing white garbage and metal impurities, and obtaining a first intermediate product;

(S2) sifting and removing dust from the first intermediate product, obtaining an intermediate filler, cooling and then soaking after performing calcination on the intermediate filler, dehydrating, drying and obtaining a material to be mixed;

(S3) evenly mixing the material to be mixed, graphite, molybdenum disulfide and other media materials according to a weight ratio of 100:5:0.5:4.5, performing enhancement treatment, grinding and obtaining a building filler; and (S4) mixing 25 parts of composite fiber, 6 parts of phenolic resin, 40 parts of the building filler, 20 parts of friction material, 0.5 parts of pyrite, 0.5 parts of carbon black, 1 part of alumina, and 7 parts of brass powder with a particle size of 40 meshes by weight, stirring in a mixer for 20-40 min till all materials are fused, taking out a fused mixture, barreling, and obtaining the friction material for the construction waste filler.

Preferably, the step of (S1) specifically comprises:
removing the fiber impurities in the building material;
calcining the building material which is removed the fiber impurities in a calciner at a temperature in a range of 550° C. to 650° C., removing the white rubbish, and then removing the metal impurities through magnetic absorption, and obtaining a second intermediate product; and
calcining after placing the second intermediate product in the calciner at a temperature in a range of 950° C. to 1050° C., sorting and removing copper and aluminum impurities.

Preferably, the step of (S2) specifically comprises:
calcining the first intermediate product at a temperature of 1200° C. for 3 h, and then naturally cooling to room temperature;
sifting and removing the dust, obtaining the intermediate filler;
performing calcination on the intermediate filler at a temperature in a range of 1500 to 1700° C. for 12 h, and then soaking in a cold pool for 1.5-2.5 h;
dehydrating and drying the soaked intermediate filler, and obtaining a material to be mixed.

Preferably, in the step of (S4), stirring is performed in the mixer for 30 min.

Preferably, in the step of (S2), performing calcination on the intermediate filler at a temperature of 1600° C. for 12 h, and then soaking in the cold pool for 2 h.

Compared with the prior art, the construction waste filler of the embodiment of the present invention is a friction material production process, to produce the construction of waste filler brakes friction material with a soft belt just, just in the belt soft properties, can be sieved into a variety of particle size, the texture of dense, high hardness, particles into a ball.

The effect is obvious, the crystal size is small, impact resistance, easy to brake pads friction material other friction material stick combined, high temperature performance and stability. It is possible to keep the brake pad material at very high temperatures coefficient of friction.

BRIEF DESCRIPTION OF THE DRAWINGS

The drawing is a block diagram of a process for producing a friction material for a construction waste filler according to a preferred embodiment of the present invention.

DETAILED DESCRIPTION OF THE PREFERRED EMBODIMENT

The invention will now be further described with reference to the accompanying drawings and specific embodiments.

Referring to the drawing, a process for producing a friction material for a construction waste filler according to a preferred embodiment of the present invention is illustrated.

The process comprises the steps of:

S1: sorting the building material to remove fiber impurities, performing calcination, removing white garbage and metal impurities, wherein:

the step of (S1) specifically includes:
removing the fiber impurities in the building material;
calcining the building material which is removed the fiber impurities in a calciner at a temperature in a range of 550 to 650 degrees Celsius to remove the white garbage and removing the metal impurities through magnetic absorption, wherein preferably, the temperature is controlled at 600 degrees Celsius; and calcining after placing the building material which is removed the metal impurities in the calciner at a temperature in a range of 950 to 1050° C., and sorting to remove copper and aluminum impurities, wherein preferably, the temperature is controlled at 1000 degrees Celsius;

wherein: in this step, the fiber impurities such as wood chips, paper chips, and fabric sorting are first removed and then calcined to remove the white garbage, and finally, the use of magnetic absorption of iron and other impurities, and then removed by high temperature melting Copper and aluminum and other metal impurities;

S2: sifting and removing dust to form an intermediate filler, cooling and then soaking after performing calcination on the intermediate filler, dehydrating, drying to produce a material to be mixed;

S3: evenly mixing the material to be mixed, graphite, molybdenum disulfide and other media materials according to a weight ratio of 100:5:0.5:4.5, performing enhancement treatment, grinding and obtaining a building filler, wherein:
indexes of the obtained building filler in this step are:
Mohs hardness is 5-6;
moisture is less than 3%;
the particle size is 40-500;
bulk densityis 2.9 g/cm3;
the proportion is 2.2-2.4;
pH is neutral acid, and S4: mixing 25 parts of composite fiber, 6 parts of phenolic resin, 40 parts of the building filler, 20 parts of friction material, 0.5 parts of pyrite, 0.5 parts of carbon black, 1 part of alumina, and 7 parts of brass powder with a particle size of 40 meshes by weight, stirring in a mixer for 20-40 min till all materials are fused, taking out a fused mixture, barreling, and obtaining the friction material for the construction waste filler.

Further, the step of (S2) specifically comprises:
calcining the first intermediate product at a temperature of 1200° C. for 3 h, and then naturally cooling to room temperature;
sifting and removing the dust, obtaining the intermediate filler;
performing calcination on the intermediate filler at a temperature in a range of 1500 to 1700° C. for 12 h, and then soaking in a cold pool for 1.5-2.5 h;
dehydrating and drying the soaked intermediate filler, and obtaining a material to be mixed.

Further, in the step of (S4), stirring is performed in the mixer for 30 min.

Further, in the step of (S2), performing calcination on the intermediate filler at a temperature of 1600° C. for 12 h, and then soaking in the cold pool for 2 h.

After the completion of construction waste filler brakes friction material production, and then use the construction waste fill brake Pad Friction Material The process of producing brake pads is as follows:

First of all, to provide steel back, and with a good steel back special glue evenly coated on the steel back for the suppression of friction the surface of the material. In this step, mainly in accordance with the ratio of accessories to add, including:

Steel back oil: steel back with a shot blasting machine to remove oil and rust;

With plastic: with alcohol or acetone diluted steel back to the work of special adhesive concentration;

Steel back glue: the use of a good steel back with a special rubber coated on the steel back to suppress the friction material surface.

Material: The mixture is weighed according to the number of the brake pads and the quantity required.

Then, the friction material is loaded on a steel back press for hot pressing to produce a semi-finished brake pad, Hot pressing temperature of 150° C.~160° C., press the pressure of 18 MPa, exhaust 3 times, each 30 seconds, insulation 300 seconds;

Finally, the semi-finished brake pads after hot pressing are subjected to a heat treatment, and the heat treatment temperature is a step heating 150° C.~180° C., the time is 4 to 12 hours, and then cooled to 50° C., the machinery and accessories installation of construction waste filler brakes. Specifically including mechanical treatment: press the brake sheet drawing process.

Require grinding, chamfering and other mechanical processing; installation of silencer: in the processing of a good brake pads installed silhouette; riveting: the attachment riveting on the back of the brake shoe; spray: the mechanical wear on the brake pads or spray on the brake pad on the model and the date of production.

Further, the construction waste filler brake pad is packaged.

Compared with the prior art, the construction waste filler of the embodiment of the present invention is a friction material production process, to produce the construction of waste filler brakes friction material with a soft in the hard, hard in the soft properties, you can sieve into a variety of particle size, the texture of dense, high hardness, particles into a ball. Increased friction effect is obvious, the crystal size is small, impact resistance, easy to brake pads Friction material Other friction material bonding, high temperature performance and stability. Able to maintain construction waste filler brakes at higher temperatures friction material is very good friction coefficient.

The foregoing is a further elaboration of the present invention in connection with specific preferred embodiments. It will not be understood that the specific implementation of the invention is limited to these illustrations. For the technology of the present invention.

It will be apparent to those skilled in the art that, without departing from the teachings of the present invention, a simple deduction or replacement should be considered as belonging to the scope of protection of the present invention.

What is claimed is:
1. A process for producing a friction material for a construction waste filler, comprising steps of:
(S1) sorting a building material, removing fiber impurities, calcining, removing white garbage and metal impurities, and obtaining a first intermediate product;
(S2) sifting and removing dust from the first intermediate product, obtaining an intermediate filler, cooling and then soaking after performing calcination on the intermediate filler, dehydrating, drying and obtaining a material to be mixed;
(S3) evenly mixing the material to be mixed, graphite, molybdenum disulfide and other media materials according to a weight ratio of 100:5:0.5:4.5, performing enhancement treatment, grinding and obtaining a building filler; and
(S4) mixing 25 parts of composite fiber, 6 parts of phenolic resin, 40 parts of the building filler, 20 parts of friction material, 0.5 parts of pyrite, 0.5 parts of carbon black, 1 part of alumina, and 7 parts of brass powder with a particle size of 40 meshes by weight, stirring in a mixer for 20-40 min till all materials are fused, taking out a fused mixture, barreling, and obtaining the friction material for the construction waste filler.

2. The method, as recited in claim 1, wherein: the step of (S1) specifically comprises:

removing the fiber impurities in the building material;

calcining the building material which is removed the fiber impurities in a calciner at a temperature in a range of 550° C. to 650° C., removing the white rubbish, and then removing the metal impurities through magnetic absorption, and obtaining a second intermediate product; and calcining after placing the second intermediate product in the calciner at a temperature in a range of 950° C. to 1050° C., sorting and removing copper and aluminum impurities.

3. The method, as recited in claim 2, wherein: the step of (S2) specifically comprises:

calcining the first intermediate product at a temperature of 1200° C. for 3 h, and then naturally cooling to room temperature;

sifting and removing the dust, obtaining the intermediate filler;

performing calcination on the intermediate filler at a temperature in a range of 1500 to 1700° C. for 12 h, and then soaking in a cold pool for 1.5-2.5 h;

dehydrating and drying the soaked intermediate filler, and obtaining a material to be mixed.

4. The method, as recited in claim 3, wherein: in the step of (S4), stirring is performed in the mixer for 30 min.

5. The method, as recited in claim 3, wherein: in the step of (S2), performing calcination on the intermediate filler at a temperature of 1600° C. for 12 h, and then soaking in the cold pool for 2 h.

* * * * *